United States Patent
Pasumarthi

(10) Patent No.: US 12,493,677 B2
(45) Date of Patent: Dec. 9, 2025

(54) METHODS AND SYSTEMS FOR BEHAVIORAL BIO FINGERPRINTING ANALYSIS

(71) Applicant: Bank of America Corporation, Charlotte, NC (US)

(72) Inventor: Kalyan V. Pasumarthi, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 54 days.

(21) Appl. No.: 18/419,740

(22) Filed: Jan. 23, 2024

(65) Prior Publication Data

US 2025/0238489 A1 Jul. 24, 2025

(51) Int. Cl.
*G06F 21/32* (2013.01)

(52) U.S. Cl.
CPC .................... *G06F 21/32* (2013.01)

(58) Field of Classification Search
CPC .............................. G06F 21/316; G06F 21/32
USPC ......................................................... 726/18
See application file for complete search history.

(56) References Cited

U.S. PATENT DOCUMENTS

| | | | |
|---|---|---|---|
| 9,213,990 B2* | 12/2015 | Adjaoute | G06Q 20/12 |
| 10,817,791 B1* | 10/2020 | Shoemaker | G06F 21/316 |
| 11,017,088 B2* | 5/2021 | Luthra | G06F 21/577 |
| 11,385,925 B1* | 7/2022 | Mitra | H04L 41/16 |
| 2023/0385390 A1* | 11/2023 | Krishnagi | G06F 21/316 |

* cited by examiner

*Primary Examiner* — Kambiz Zand
*Assistant Examiner* — Lawrence Q Truong
(74) *Attorney, Agent, or Firm* — Weiss & Arons LLP

(57) ABSTRACT

Methods and systems for providing a behavioral bio fingerprinting analysis system. The system includes an electronic system with a receiver for receiving a request from a user's mobile device. The mobile device includes an electronic file for storing behavioral data. The system further comprises an in-house AI model for retrieving behavioral data about a user. The system further includes a processor for generating an AI model that retrieves the behavioral data from the user's mobile device and form related AI systems. The AI model may store the behavioral data and may run a behavioral analysis. The behavioral analysis may include a series of tests. The user may be authenticated. Access into the system may be granted to the user upon passing the series of tests.

10 Claims, 4 Drawing Sheets

METHODS AND SYSTEMS FOR BEHAVIORAL BIO FINGERPRINTING ANALYSIS

FIELD OF TECHNOLOGY

Aspects of the disclosure relate to authentication and authorization. Specifically, aspects of this disclosure relate to behavioral data and behavioral data analysis for use with systems and methods involving authentication and authorization.

BACKGROUND OF THE DISCLOSURE

Currently, select user-interfacing systems are not provided with user device information and/or other information. Systems have prospective clients or users that request access into the system. Smooth system operation and/or system security may be disrupted if a person of malicious intent accesses the system. Therefore, systems may need to research each prospective user or client before granting the user or client access into a system. It should be noted that select systems do not have the information that enables research of the prospective user and/or client.

Therefore, it would be desirable to create a method in which systems can obtain information and behavioral data about the prospective client and/or user. This may be done by researching, analyzing and collecting behavioral data of prospective clients and/or users. An AI model may collect behavioral data belonging to the prospective clients and/or users from another system. The behavioral data can be collected from the client's user device and/or other suitable locations.

SUMMARY OF THE DISCLOSURE

Apparatus, methods and systems for behavioral bio fingerprinting analysis are provided. A user may request access into an electronic system. The request may be an initial request from the user. The user may be referred to as a new user. A receiver may receive the initial request from the user to log in to the electronic system. The request may include an input from the user of a username and password and/or any other suitable request input. The request may be placed in a front-end of a website and/or system. The front-end of a website or system may be a graphical user interface ("GUI") webpage of a website, a uniform resource locator ("URL") and/or any other suitable front-end.

A processor in the system may process the request. The request may have been sent from a user's mobile device. The system may desire to authorize and authenticate the identity of the user. The authentication and authorization of the user may provide the user with access into the system.

The request from the user's mobile device may provide the system with access to the user's mobile device. The user's mobile device may have the user's behavioral data. Behavioral data may include sites frequented by the user, social media posts, accounts the user created, items added to shopping carts and/or any other suitable behavioral data.

Systems may desire to receive additional information about the user from other suitable locations. Another location may be in-house models related to the system. The in-house models may be in-house AI models. The in-house models may be in a system related to the system the user desires to access. The system may include numerous related systems. Each of the related systems may have one or more in-house AI models that store information about users. Related systems may be systems that have access to one another. Related systems, for the purposes of this application, may be smaller systems that form a part of a bigger system. Related systems may also be systems that form a part of a blockchain. The user may have accessed the related systems at a different time.

The related systems may have in-house models that include behavioral data about the user. The in-house models may provide behavioral data to the system. The behavioral data provided may include interactions the user has had with the related systems. The behavioral data may additionally include the user's history with the site.

The system may create an AI model. The AI model may retrieve the user's behavioral data from the various locations. The AI model may store the retrieved behavioral data. The AI model may perform a behavioral analysis.

The behavioral analysis may include a series of tests. Each of the series of tests may include levels. There may be a single pre-determined level associated with each test. The predetermined level may be a level that determines whether a user can be authenticated and authorized for logging into the system. The user may reach a second level if the user passes the first level. There may be one or more additional levels that the user may have to pass until the user reaches the pre-determined level.

Upon achieving the pre-determined level, the user may receive authentication and authorization. Upon authentication and authorization, the request to log in to the system may be granted. In an instance where the user does not reach the pre-determined level, the user's request to log in to the system may be denied.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
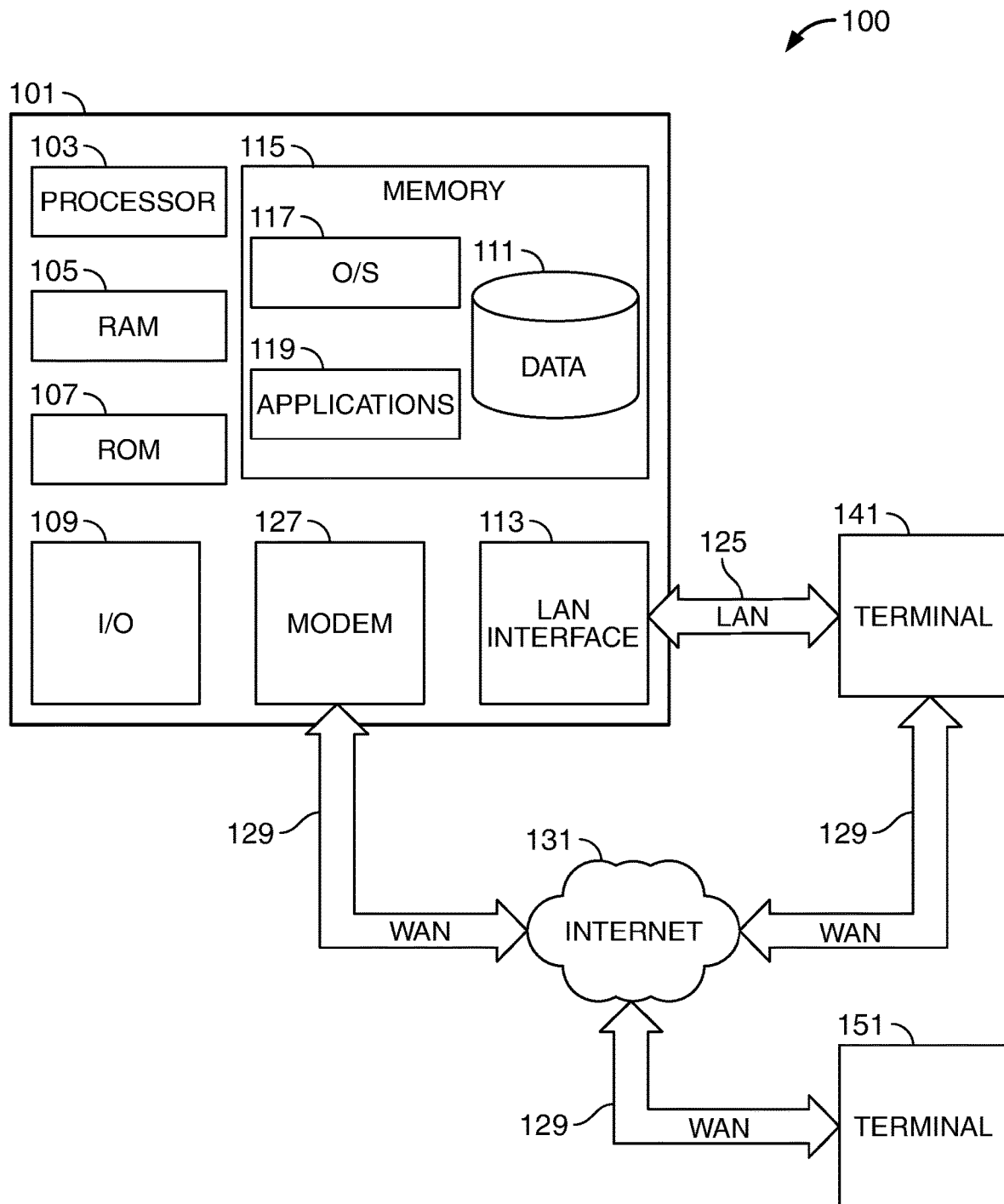
FIG. 1 shows an illustrative diagram in accordance with principles of the disclosure.

Apparatus, systems and methods for behavioral bio fingerprinting analysis are provided. A user may place a request to access an electronic system. The request may be an initial request from the user. The request may be sent from a user's mobile device. The system may determine if the user is an authentic user. If the user is an authentic user, the system may allow the user to enter the system. The system may perform a behavioral analysis determining if the user is an authentic user.

The request from the user may grant the system access into the user's mobile device. The user's mobile device may provide the system with behavioral data about the new user.

The user's mobile device may store user's behavioral data. User's behavioral data, also referred to as behavioral data, may include information pertinent to the user. Behavioral data may include sites the user visits often. Behavioral data may also include posts and likes the user has posted. Website views, adding an item to a shopping cart, creating an account and newsletter sign ups may be additional behavioral data provided by the user's mobile device. Behavioral data may include and/or other information about the user.

The system may also access in-house Artificial Intelligence ("AI") models. The system may access in-house AI models that will provide the system with additional data about the new user. The in-house AI models may be models from additional systems related to the system the user has logged in to. The user may have logged into to the related systems, and therefore the related systems may provide the electronic system with data about the user. The system may have access to data about the new user from the user's mobile device and from the in-house AI models.

An AI model may include a processing unit. The processing unit may provide processing capabilities to the AI model. The processing unit may be a central processing unit ("CPU"). The processing unit may be a graphical processing unit ("GPU"). The processing capabilities may be used by the AI model to perform processing and computing functions.

The AI model may receive data. The AI model may receive substantial amounts of data. The data may be received from various sources. The data may be received from entity specific sources. The data may be received from public sources. The data may be received from private sources. Data that is received from public sources may include information that can be shared, used, reused and/or redistributed without restriction. Data that is received from private sources may include personal, personally identifiable, financial, sensitive or regulated information of a specific person or entity.

The AI model may learn from experience via iterative processing and algorithmic training. The AI model may include progressive learning algorithms. The progressive learning algorithms may ingest the data. The progressive learning algorithms may analyze the ingested data. The progressive learning algorithms may analyze the data for correlations and patterns within the data. The progressive learning algorithms may use the analyzed correlations and patterns to make predictions. The AI model may update the progressive learning algorithm based on the predictions curated from the analyzed correlations and patterns. A combination of the data, the predictions and/or the progressive learning algorithm may be used to dynamically program the AI model.

The AI model may test and measure the accuracy of generated outputs. By providing the AI model with labeled training and testing datasets, the AI model may measure the accuracy of the generated output by comparing the generated outputs to the labeled training and testing datasets. Based on the comparing of the generated outputs to the labeled training and testing datasets, the AI model may update the progressive learning algorithm to provide a more accurate performance. The AI model may improve predictions by using training and testing datasets. The training of the AI model may be dynamically updated using testing and training sets.

The AI model may include machine learning algorithms. Machine learning algorithms may enable the AI model to learn from experience without specific instructional programming. The AI model may include deep learning algorithms. Deep learning algorithms may utilize neural networks. Neural networks may use interconnected nodes or neurons in a layered structure to analyze data and predict outcomes. The AI model may include natural language processing ("NLP"). NLP may enable AI models to recognize, analyze, interpret and understand written and/or spoken human language. The AI model may include any other suitable algorithms or components.

The methods may include training a first AI model. The training may occur in a pre-detection stage. The pre-detection stage may occur before the first AI model is used to detect whether an AI model is impersonating a human user. The pre-detection stage may enable the first AI model to identify whether an AI model is impersonating a human user.

Training may include providing a first dataset to the first AI model. The first dataset may include a communication. The communication may be a textual communication. The communication may be an audio communication. Audio communications may be transcribed from audio format to text format. The communication may be executed between two or more human users.

Training may include providing a second dataset to the first AI model. The second dataset may include an impersonation of the communication. The impersonation of the communication may be a copy of the communication that includes randomized identifiers. As such, an impersonation may include a set of facts similar to the communication, however, the identifiers may be changed.

The system may retrieve the behavioral data researched from among the user's mobile device, the AI models and/or any other suitable locations. The data retrieved may be stored in an AI model. The AI model may be designed to perform a behavioral analysis of the user. The behavioral analysis may include performing a series of tests.

The series of tests may include questions about the user. The AI model may provide a reply to the questions based on the user's behavioral data. The reply may either be a positive reply or a negative reply. In the event that the reply confirms that the user exhibits poor fiscal responsibility, when all the answers reply in the positive, access to the system for the user may be denied. In the event that the reply to the questions is answered in the negative, confirming that the user exhibits positive fiscal responsibility, the user may be allowed to access and become a member of the system.

In some embodiments, the series of tests may include levels. Upon a negative response to a question, displaying that the user displays positive fiscal activity, the user may pass a level and may enter a next level. The user may pass levels until the user reaches a pre-determined level. The pre-determined level may be a level that allows the user to access the system.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an artificial intelligence implemented termination program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an artificial intelligence implemented termination program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, Wi-Fi, cellular networks, or other suitable frequencies.

Any memory may be comprised of any suitable permanent storage technology—e.g., a hard drive or other non-transitory memory. The memory may store software including an operating system and any application(s) (such as an artificial intelligence implemented termination program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or Wi-Fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, Wi-Fi, cellular networks or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an artificial intelligence implemented termination program and security protocols, as well as other programs. In an embodiment, one or more programs, or aspects of a program, may use one or more artificial intelligence/machine learning ("AI/IL") algorithm(s). The various tasks may be related to terminating or preventing a malicious AI from completing its malicious activities.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
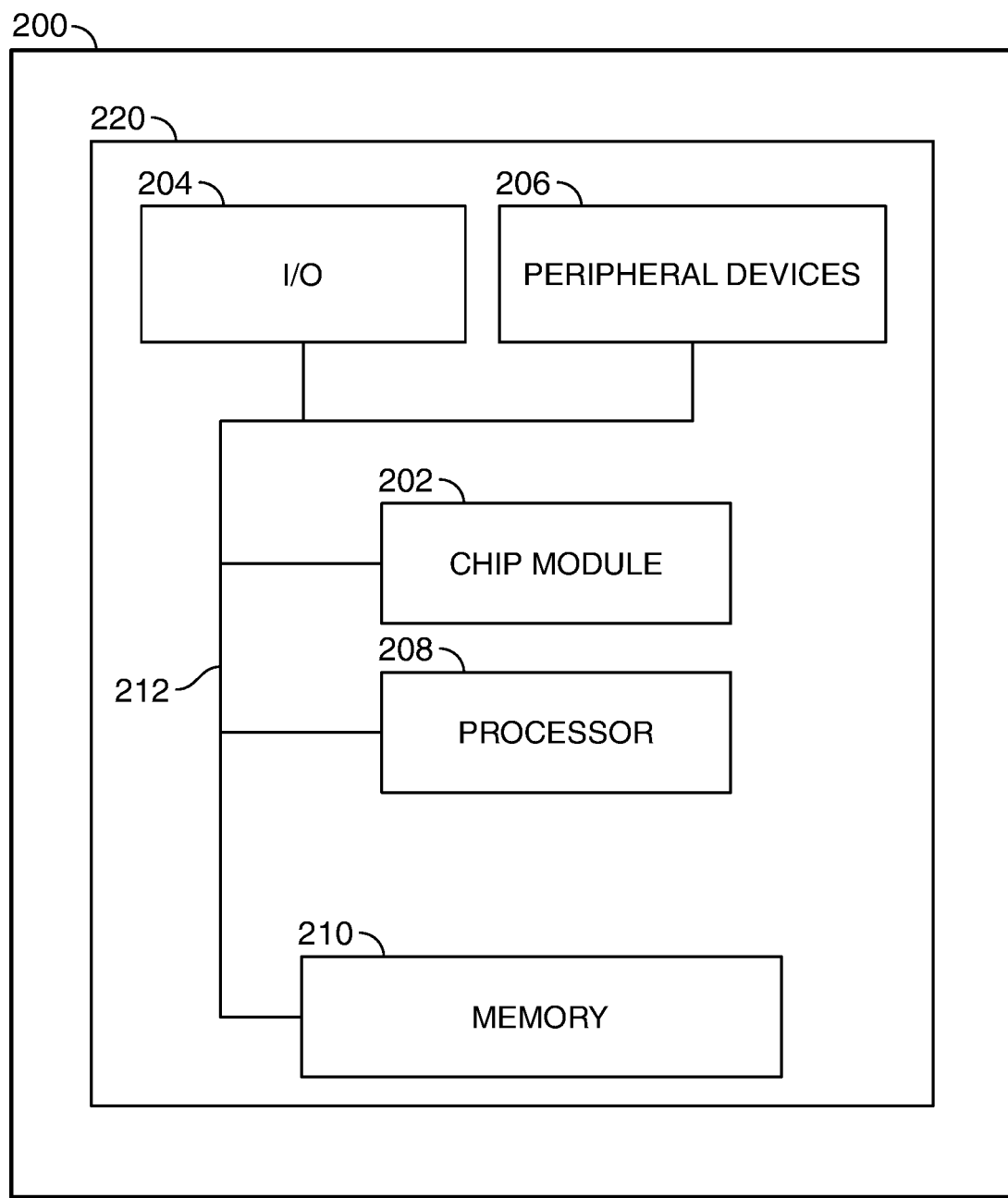
FIG. 2 shows another illustrative diagram in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-4. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
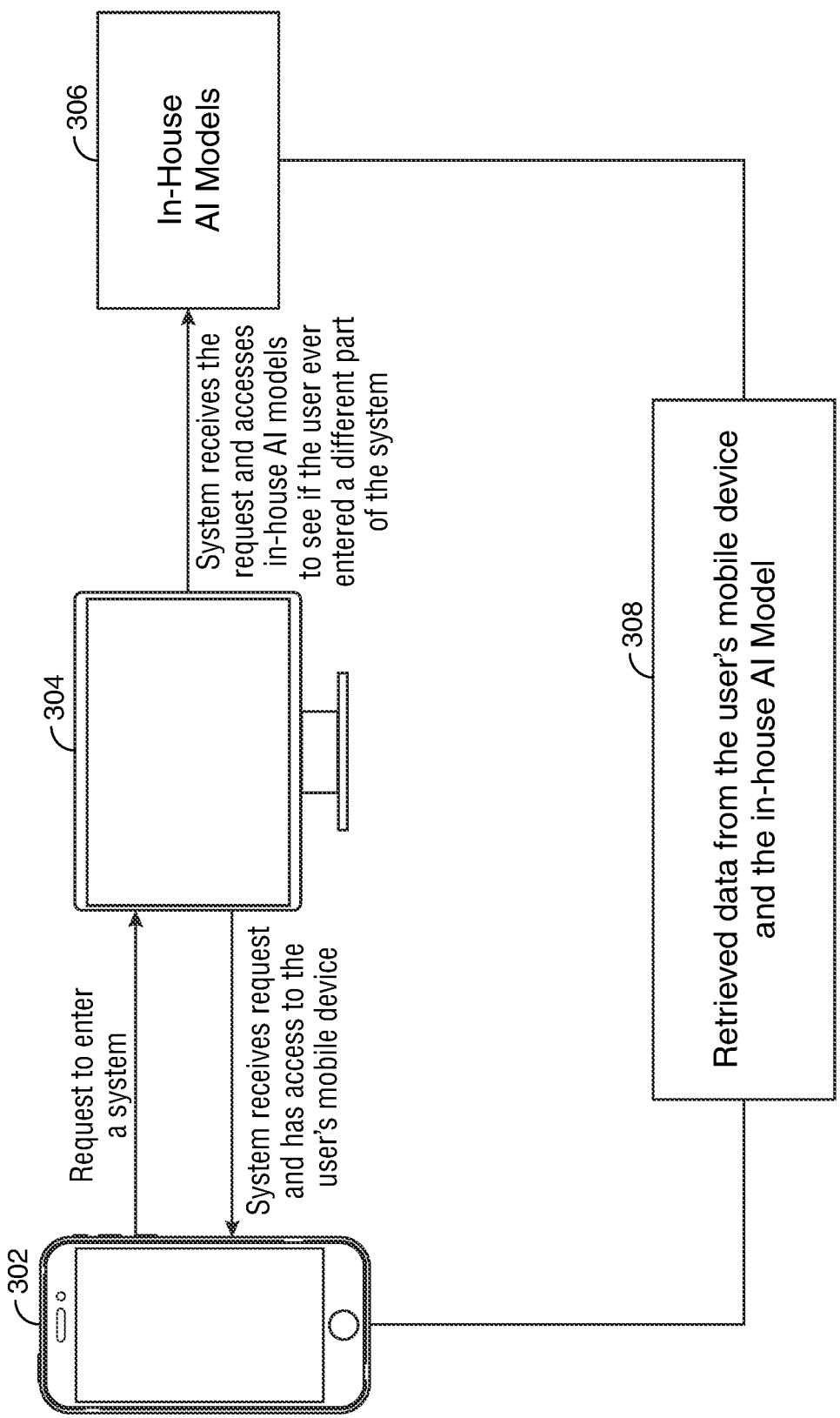
FIG. 3 shows yet another illustrative flow diagram in accordance with the principles of the disclosure.

FIG. 3 shows a new user requesting access into an electronic system. The electronic system may be system 304. System 304 may include a website and/or any other suitable apparatus. Users may log in to a front-end of system 304. A front-end of the system may be graphical user interface ("GUI") on a webpage. The request to access system 304 may be a request from a user's mobile device 302 including a username and password. The request may or may not include other information.

There may be a receiver in system 304 that may receive the request. The request sent from the user's mobile device may provide system 304 access into user's mobile device 302. System 304 may authenticate and authorize user access into the system.

System 304 may attempt to collect behavioral data from the user. The behavioral data may assist in authenticating and authorizing the new user. System 304 may collect behavioral data from the user's mobile device 302. System 304 may additionally collect behavioral data from in-house AI models. In-house AI models may be in-house AI models 306. The new user may have accessed systems related to system 304. In the event that the new user has previously accessed other related systems, the system may collect behavioral data from the related systems. In the event that the new user has not accessed any related systems, system 304 may collect behavioral data from the user's mobile device and/or other locations.

The behavioral data may be collected from the user's mobile device and the in-house AI models, as shown in step 308. Behavioral data, for the purposes of this application, may be understood to refer to interactions, via internet, cloud, mobile devices and/or any other suitable communication systems, with customers, partners, applications and systems in granular detail. Behavioral data may include website views, newsletter sign-ups, adding an item to a shopping cart, creating an account on a website, "liking" a social media post, downloading an app and/or any other suitable behavioral data. These interactions can be processed and evaluated to reveal why customers do certain things, how customers would react to different situations, what would cause customers to react and/or any other suitable conclusions.

The collection of the behavioral data may be analyzed to determine if the new user is a user to whom the system would want to allow access. Behavioral data may provide pertinent information about the new user.

Figure 4:
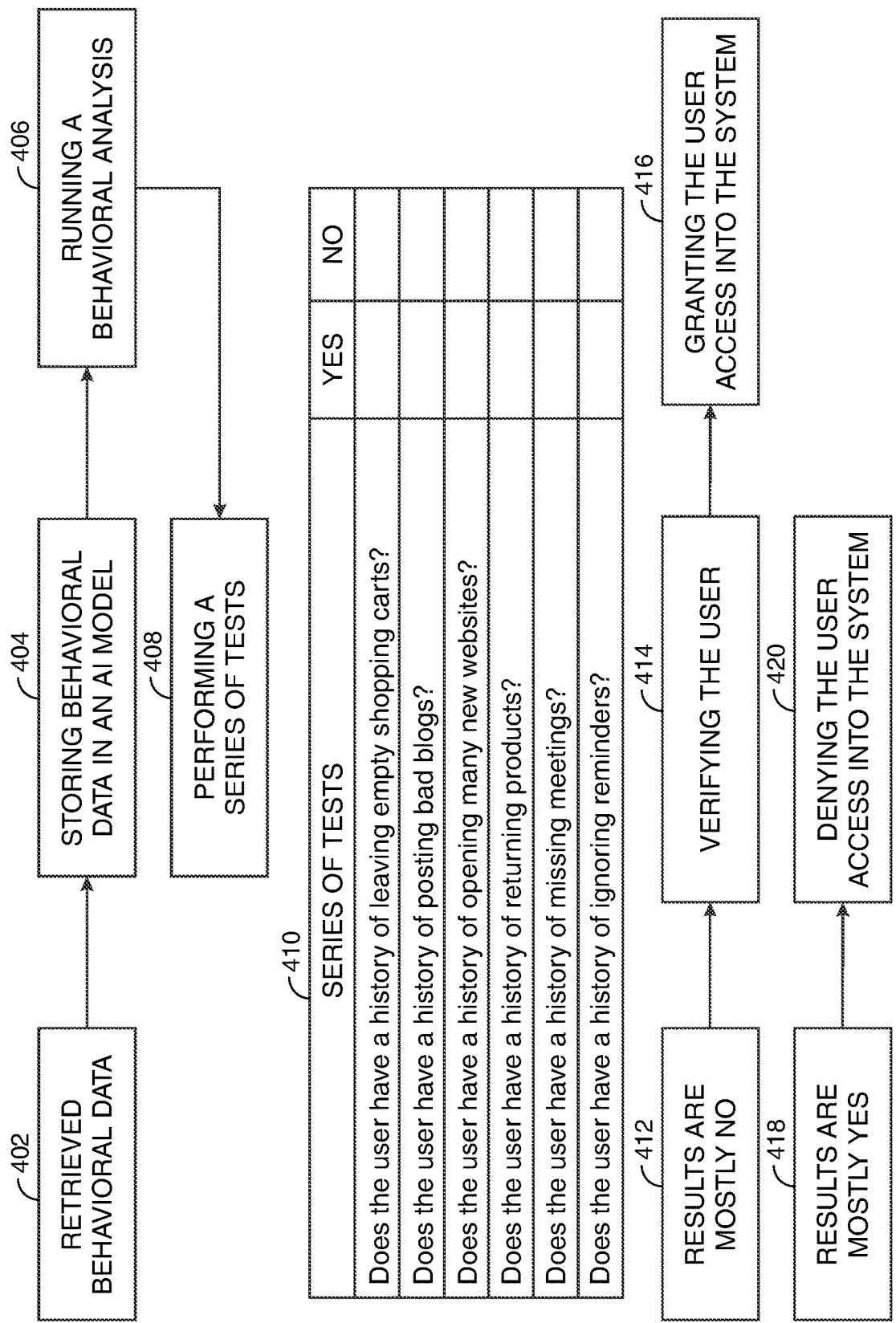
FIG. 4 shows still another illustrative flow diagram in accordance with the principles of the disclosure.

FIG. 4 shows a flow diagram of the behavior analysis. The retrieved behavioral data, as shown in step 402, may be placed in an AI model, shown in step 404. There may be a behavior analysis that takes place in, and with use of, the AI model, as shown in step 406. The AI model may run the behavioral analysis. The behavioral analysis may be run by performing a series of tests, as shown in 408. The tests may include tests as shown in series of tests 410. There may be other tests included in the series of tests. The tests may include questions. The AI model may answer the questions. The AI model may determine an answer appropriate for the user based on the behavior data collected from the user's mobile devices and the in-house AI models.

If a plurality of the answers performed in the series of tests are in the negative, as shown in step 412, then the user may be verified and authenticated, as shown in step 414. Once the user is verified and authenticated, then access into the system may be granted to the user, as shown in step 416.

If a plurality of the answers were answered in the affirmative, as shown in step 418, then the system may deny access to the new user, as shown in step 420.

Thus, systems and methods for behavioral bio fingerprinting analysis are provided. Persons skilled in the art will appreciate that the present invention can be practiced by other than the described embodiments, which are presented for purposes of illustration rather than of limitation. The present invention is limited only by the claims that follow.

What is claimed is:

1. A method for performing a behavioral bio fingerprinting analysis, the behavioral bio fingerprinting analysis based on behavioral data, the behavioral bio fingerprinting analysis for use with, authorizing and authenticating a new user into an electronic system, the method comprising:
   receiving a request from the new user to log in to the electronic system, the request being transmitted from a user's mobile device of the new user, the request granting the electronic system access into the new user's mobile device;
   generating an Artificial Intelligence (AI) model, the AI model configured for:
      retrieving behavioral data relating to the new user, wherein the retrieving includes:
         retrieving the behavioral data from the new user's mobile device;
         retrieving the behavioral data related to the new user from one or more in-house AI models; and
         retrieving the behavioral data from one or more related systems, said related systems comprising systems related to the electronic system;
      storing the behavioral data;
      running a behavioral analysis of the new user, said running using the behavioral data stored in the AI model, said behavioral analysis being based on the stored behavioral data;
      performing a series of tests for authorizing and authenticating an identity of the new user, the series of tests comprising:
         a plurality of queries;
         a response to each of the queries;
         a plurality of authorization levels; and
         a predetermined authorization level from within the plurality of authorization levels wherein when the user reaches the predetermined authorization level based on the response to the queries, the AI model is configured to authorize and authenticate the new user;
      based on the authorization and authentication, granting the new user access into the electronic system; and
      when the new user does not reach the predetermined authorization level, denying the new user access into the electronic system.

2. The method of claim 1 wherein the behavioral data from the new user's mobile device includes a history of sites visited by the new user.

3. The method of claim 1 wherein the one or more in-house AI models provide behavior data on the new user if the new user has previously accessed a system related to the one or more in-house AI models.

4. The method of claim 1 wherein the request from the new user is an initial request of the new user to log in to the electronic system.

5. The method of claim 1 wherein the request from the new user is an initial request received by an AI model.

6. The method of claim 1 wherein the series of tests performed provides the system with fiscal responsibilities relating to the new user.

7. The method of claim 1 wherein the series of tests includes the plurality of authorization levels, the plurality of authorization levels determining the authentication of the new user.

8. Apparatus for performing a behavioral bio fingerprinting analysis, the behavioral bio fingerprinting analysis based on behavioral data, the behavioral bio fingerprinting analysis for use in authorizing and authenticating a new user into an electronic system, the apparatus comprising:
   the electronic system;
   a receiver, said receiver receiving a request from the new user to log in to the electronic system;
   a user's mobile device of the new user;
   an in-house Artificial Intelligence (AI) model;
   an electronic file, the electronic file corresponding to actions, said actions found among the new user's mobile device; and
   a processor, the processor configured to;
      generate an AI model, the AI model configured to:
         retrieve the behavioral data from the new user's mobile device;
         retrieve the behavioral data from one or more related systems, said related systems comprising systems related to the electronic system;
         store the behavioral data;
         run a behavioral analysis of the new user using the AI model, the behavioral analysis running based on the stored behavioral data;
         perform a series of tests, the series of tests comprising:
            a plurality of queries;
            a response to each of the queries;
            a plurality of authorization levels; and
            a predetermined authorization level from within the plurality of authorization levels, wherein when the new user reaches the predetermined authorization level based on the response to the queries, the AI model is configured to authorize and authenticate the new user;
      based on the authorization and authentication, grant the new user access into the electronic system; and
      when the new user does not reach the predetermined authorization level, deny the new user access to the electronic system.

9. The apparatus of claim 8 wherein the new user is attempting to log in into the electronic system for a first time.

10. The apparatus of claim 8 wherein the processor is further configured to produce the series of authorization levels from the series of tests to authorize and authenticate the new user.

* * * * *